United States Patent [19]
Crabb

[11] Patent Number: 5,312,176
[45] Date of Patent: May 17, 1994

[54] SELF-ALIGNING IDLER WHEEL ASSEMBLY

[75] Inventor: Elmer R. Crabb, Aurora, Ill.

[73] Assignee: Catepillar Inc., Peoria, Ill.

[21] Appl. No.: 950,543

[22] Filed: Sep. 25, 1992

[51] Int. Cl.$^5$ .............................................. B62D 55/15
[52] U.S. Cl. ......................................... 305/21; 305/60; 180/9.1; 198/806
[58] Field of Search ..................... 305/21, 29, 30, 31, 305/56, 60; 180/9, 9.1, 9.5, 9.52, 10, 9.62, 9.64, 9.46; 198/806, 807, 840

[56] References Cited

U.S. PATENT DOCUMENTS

| | | | |
|---|---|---|---|
| 2,304,843 | 12/1942 | Nordquist | 198/807 |
| 2,535,762 | 12/1950 | Tapp et al. | 180/75 |
| 3,170,531 | 2/1965 | Katzenberger | 180/9.1 |
| 4,693,363 | 9/1987 | Kuehnert | 198/807 |
| 4,834,478 | 5/1989 | Stevens et al. | 305/21 |
| 4,923,257 | 5/1990 | Purcell | 305/29 |
| 5,018,591 | 5/1991 | Price | 180/9.5 |
| 5,050,710 | 9/1991 | Bargfrede | 188/71.6 |
| 5,127,714 | 7/1992 | Satzler | 305/60 |

*Primary Examiner*—Russell D. Stormer
*Attorney, Agent, or Firm*—Claude F. White

[57] ABSTRACT

A self-aligning idler wheel assembly for a belted work vehicle includes a spindle having first and second radially extending flange portions. First and second self-aligning mechanisms are associated with a respective flange portion. The vehicle has an undercarriage assembly including a belt tensioning mechanism and a roller frame assembly. The first self-aligning mechanism connects the idler wheel assembly to the belt tensioning mechanism and the second self-aligning mechanism connects the idler wheel assembly to the roller frame assembly. The first and second self-aligning mechanisms provide self-aligning of the idler wheel assembly to ensure that the track belt runs straight and true.

20 Claims, 6 Drawing Sheets

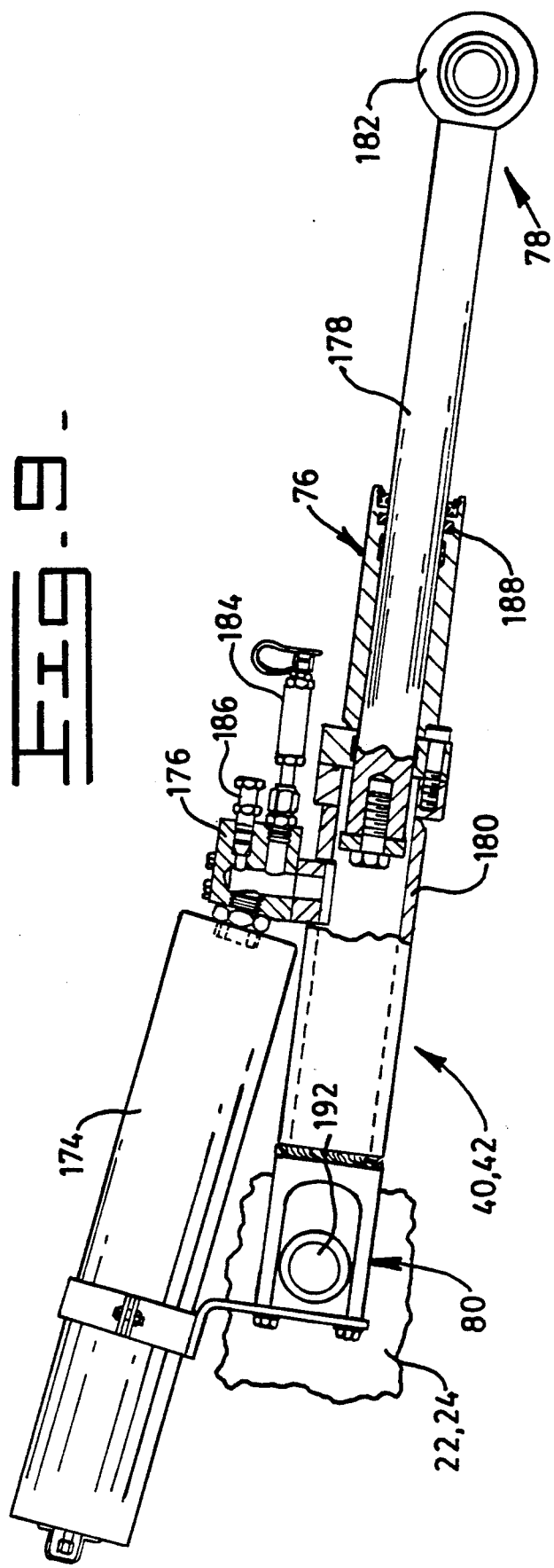

SELF-ALIGNING IDLER WHEEL ASSEMBLY

TECHNICAL FIELD

This invention relates generally to an idler wheel assembly for a work vehicle and more particularly to a self-aligning idler wheel assembly for a belted work vehicle having endless elastomeric drive belts.

BACKGROUND ART

Work vehicles equipped with endless elastomeric drive belts are being utilized in earthmoving and agricultural applications to replace vehicles equipped with metal track and rubber tired wheels. The vehicles having elastomeric track belts offer many advantages over previously utilized vehicles, including less weight and maintenance, lower soil compaction, lower noise levels, and the ability to travel on improved roadways.

Most of the endless track belt assemblies include a plurality of center mounted guide blocks to guide the endless belt as it rotates around the drive wheel, the guide rollers, and the idler wheel. It is important to have the endless belt properly aligned with the rollers, wheels, and guide blocks to prevent excessive contact between the guide blocks and the various rollers and wheels. Excessive contact between these members generates heat and accelerated wear.

One type of vehicle having an endless elastomeric belt and an adjustment means for adjusting the angularity of the belt is disclosed in U.S. Pat. No. 5,050,710 issued to B.C. Bargfrede on Sep. 24, 1991. In this patent, an adjustment device, including a plurality of inboard and outboard shims, adjusts the angular disposition of the housing assembly, and thus the inclination angle of the central axis of the idler wheel assembly. Although this is a rather simple method of adjusting the angle of the idler wheel, considerable time and effort is required to insert or remove the shims. The shims also need to be stored in some convenient place.

The present invention is directed toward overcoming one or more of the problems as set forth above.

DISCLOSURE OF THE INVENTION

In one aspect of the present invention, a self-aligning idler wheel assembly for a belted track vehicle has a spindle having first and second shaft portions and a middle portion having first and second flange portions, first and second wheels connected to the first and second shafts, and a self-aligning mechanism connected to the first flange portion.

Prior art belted track work vehicles utilize various means to adjust the angle of the idler wheel with respect to the track roller frame in order to center the track belt and ensure that it runs true and straight. The most common adjusting means includes a plurality of flat shims of varying thickness which are inserted between components of the idler wheel mountings. Shims can be added or removed to change the angle of inclination of the central axis of the idler wheel. Such adjustments are generally time consuming and require a certain amount of trial and error.

The subject invention provides an idler wheel assembly which is self-aligning to ensure that the track belt runs straight and true.

BRIEF DESCRIPTION OF THE DRAWINGS

FIG. 9 is a diagrammatic side elevational view of a self-contained hydraulic ram used with the subject invention.

BEST MODE FOR CARRYING OUT THE INVENTION

Figure 1:
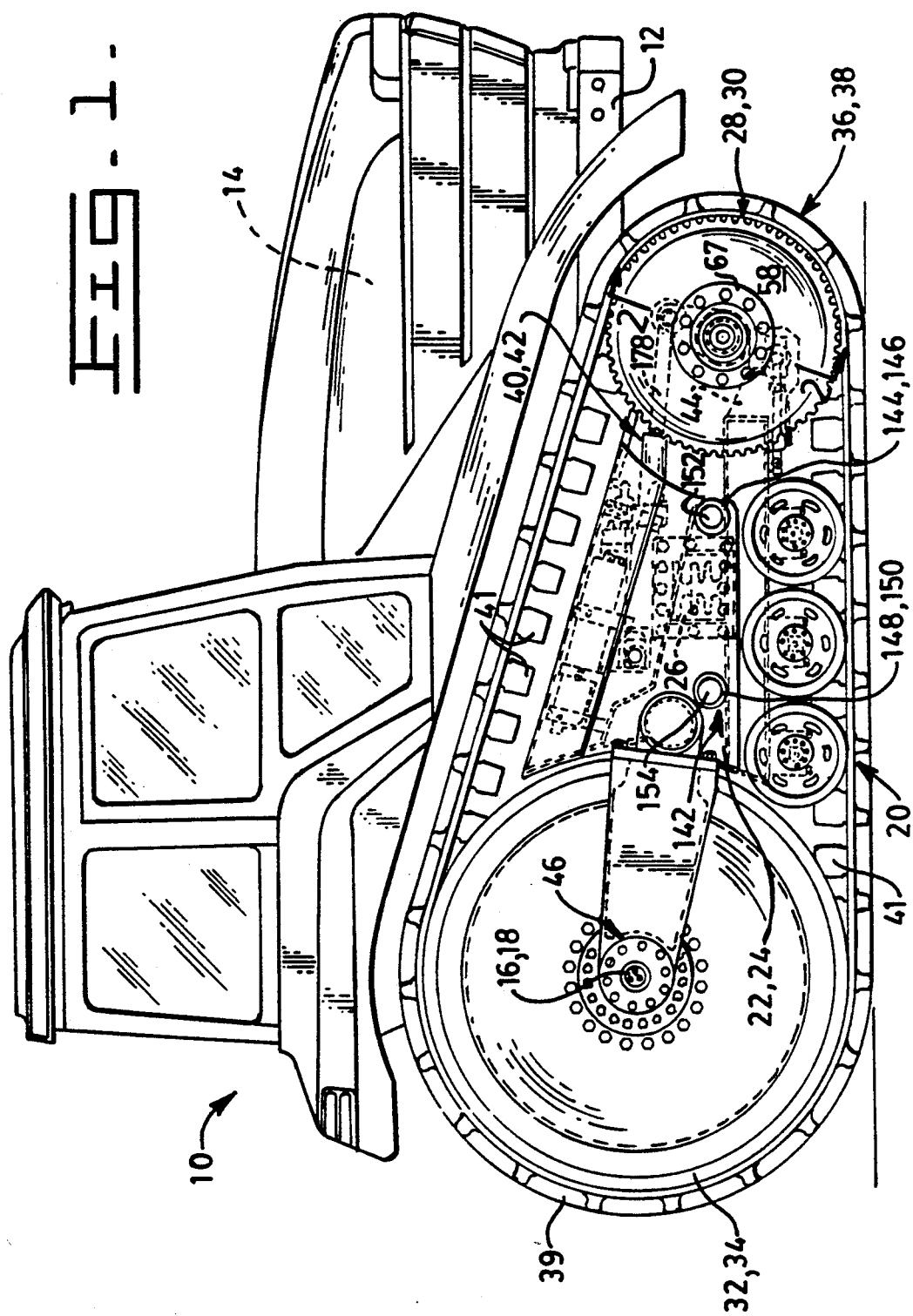
FIG. 1 is a diagrammatic side elevational view of a vehicle incorporating the subject invention.
Figure 2:
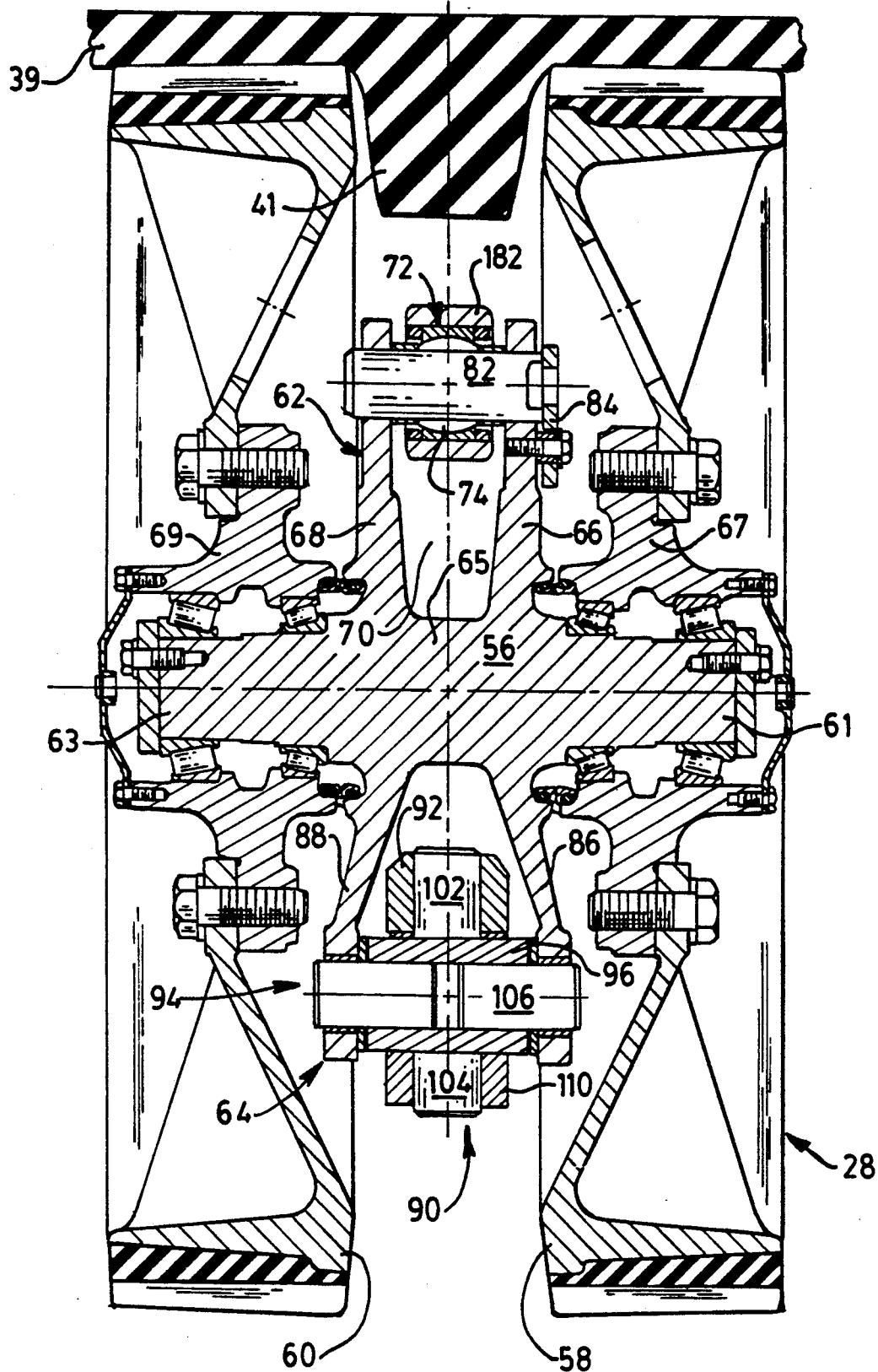
FIG. 2 is a diagrammatic cross-sectional view taken generally along the lines 2—2 of FIG. 1.
Figure 3:
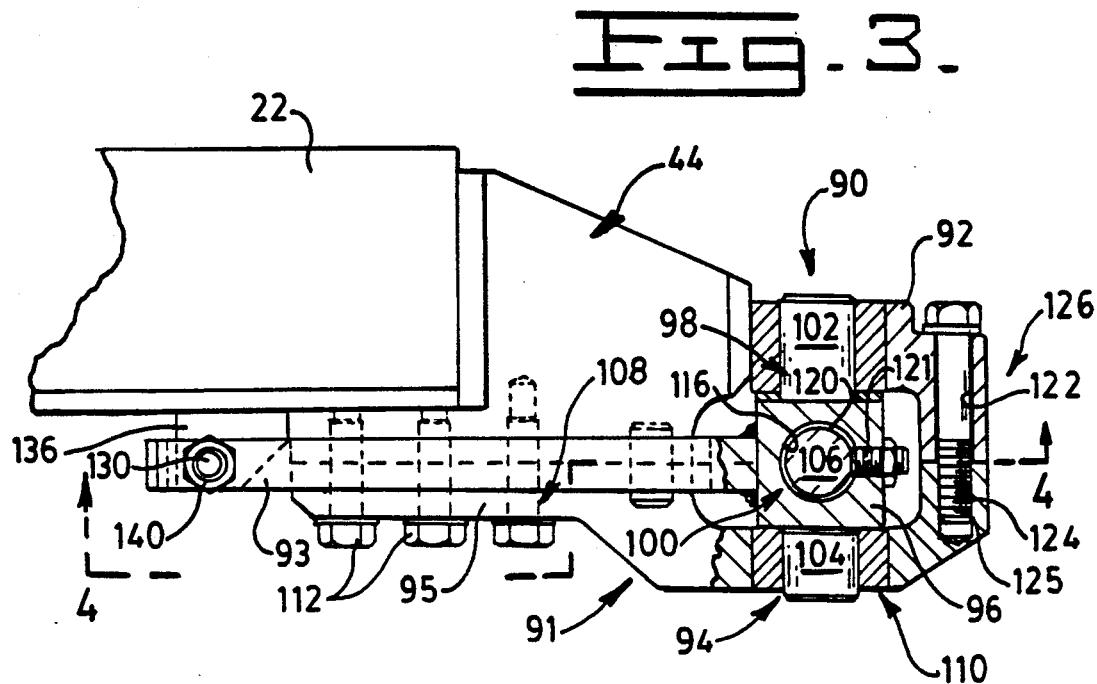
FIG. 3 is a diagrammatic side elevational view, partly in section, of a self-aligning mechanism of the present invention.
Figure 4:
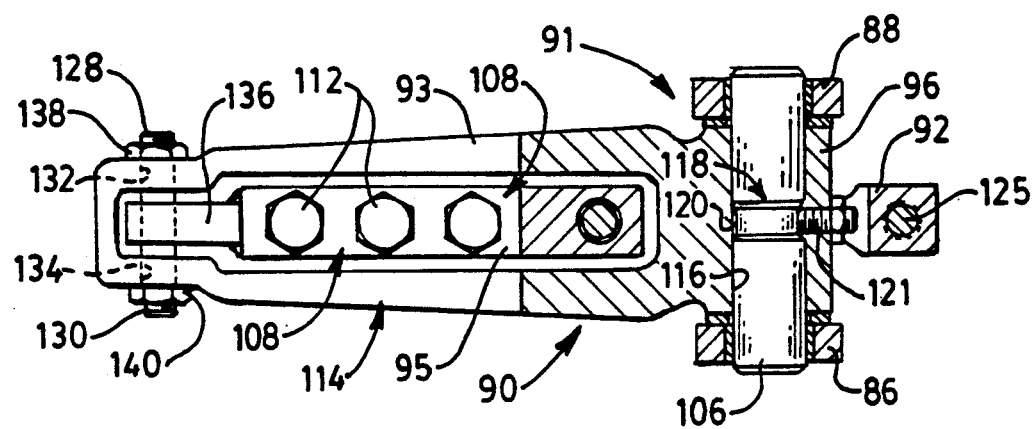
FIG. 4 is a diagrammatic cross-sectional view taken generally along the lines 4—4 of FIG. 3.

Referring to the drawings, a belted track vehicle 10 has a main frame 12, an engine 14, and first and second drive axles 16, 18 which are powered by the engine 14. An undercarriage assembly 20 for the vehicle includes first and second roller frame assemblies 22, 24, a support beam 26, first and second self-aligning idler wheel assemblies 28, 30, first and second drive wheels 32, 34, and first and second endless track assemblies 36, 38 encircling respectively the first and second drive wheels 32, 34, the first and second roller frame assemblies 22, 24, and the first and second idler wheel assemblies 28, 30.

Each of the track assemblies 36, 38 includes an endless elastomeric belt 39 which supports and propels the vehicle. The belt 39 has a plurality of inwardly facing guide blocks 41. The undercarriage assembly 20 further includes first and second self-contained hydraulic belt tensioning mechanisms 40, 42. It is to be understood that most of the components of the undercarriage assembly 20 on the left hand side of the vehicle 10, as shown in FIG. 1, are duplicated and are substantially similar to those components on the right hand side.

Each of the roller frame assemblies 22, 24 has first and second end portions 44, 46 and a middle portion 48, with the second end portions 46 being releasably connected to a respective first and second drive axle 16, 18. The support beam 26 has first and second end portions 50, 52 and a middle portion 54 which is releasably connected to the vehicle main frame 12. The first and second end portions 50, 52 are releasably connected to the middle portion 48 of a respective first and second roller frame assembly 22, 24.

Each of the idler wheel assemblies 28, 30 has a spindle 56 and first and second spaced wheels 58, 60 rotatably supported on the spindle 56. Each spindle 56 includes first and second spaced apart shaft portions 61, 63, a middle portion 65, and first and second plates 67, 69 rotatably connected to respective first and second shaft portions 61, 63. The wheels 58, 60 are connected to respective first and second plates 67, 69. Each spindle 56 also has first and second radially extending flange or ear portions 62, 64, with the first ear portion 62 having first and second spaced flanges 66, 68 which define a space 70 therebetween. A first self-aligning mechanism 72, including a spherical bearing assembly 74, is positioned between the flanges 66, 68 and within the space 70. Each of the track tensioning mechanisms 40, 42 includes an hydraulic ram assembly 76 having a first end portion 78 connected to a respective first spindle ear portion 62. A second end portion 80 of each ram assembly 76 is connected to a respective roller frame assembly 22, 24. The first self-aligning mechanism 72 serves to connect the first end portion 44 of each track tensioning mechanism 40, 42 to the first ear portion 62 of each spindle 56 by way of a retaining pin 82. The retaining pin 82 has a radially extending connecting portion 84 which is connected to the first flange or ear portion 62.

The second ear portions 64 include third and fourth spaced flanges 86, 88, and a second self-aligning mechanism 90 is positioned between and connected to these flanges 86, 88. A means 92 for pivotally connecting the second self-aligning mechanism 90 to the roller frame 22 includes a lever member 93 and a cap member 95. The first end portion 44 of each roller frame assembly 22, 24 has a forwardly extending nose portion 92 and the second self-aligning mechanism 90 connects the nose portion 92 to the second flange, or ear, portion 64 of each spindle 56. The second self-aligning mechanism 90 serves to releasably connect each spindle 56 to the first end portion 44 of each roller frame assembly 22, 24.

The second self-aligning mechanism 90 includes a universal type apparatus 94 having a block portion 96 having first and second connecting portions 98, 100. The first connecting portion 98 includes first and second connecting pins 102, 104 and the second connecting portion 100 includes a third connecting pin 106. The third connecting pin 106 is positioned at an angle which is substantially normal to the first and second pins 102, 104. The third and fourth spaced flanges 86, 88 are adapted to be pivotally connected to said third connecting pin 106. The universal type apparatus 94 includes the lever member 93 and the cap member 95, with the block portion 96 forming a portion of the lever member 93. The cap member 95 has a mounting portion 108 and a pin receiving portion 110, with the mounting portion 108 being connected to the roller frame assembly 22 by a plurality of threaded fasteners 112. The pin receiving portion 110 is adapted to receive the second connecting pin 104 of the universal type apparatus 94.

The lever member 93 includes a bifurcated yoke portion 114 at one end and the block portion 96 at the opposite end. The yoke portion 114 is adapted to surround the mounting portion 108 of the cap member 95. The block portion 96 has a bore 116 extending therethrough at an angle which is substantially normal to the first and second connecting pins 102, 104. The third connecting pin 106 is positioned within the bore 116 and, as previously noted, pivotally connects the third and fourth flanges 86, 88 to the block portion 96. A securing means 118, such as a circumferential groove 120 in the pin 106 and a threaded fastener 121 extending through the block portion 96, secures the pin 106 within the bore 116.

The forwardly extending nose portion 92 is adapted to receive the first connecting pin 102, and in combination with the cap member 95 and the second connecting pin 104, pivotally connects the idler wheel assembly 28 to the roller frame assembly 22. A bore 122 in the extending nose portion 92, a threaded bore 124 in the pin receiving portion 110 of the cap member 95, and a threaded fastener 125 which penetrated the bore 120 and engages the threaded bore 122, provides a means 126 for connecting the extending nose portion 92 to the pin receiving portion 110.

First and second threaded fasteners 128, 130, and corresponding first and second threaded holes 132, 134 in the yoke portion 114 of the lever member 93 provide a means for moving the yoke portion 114 laterally relative to the cap member 95. The threaded fasteners 128, 130 are adapted to engage an extension 136 of the roller frame assembly 22. First and second lock nuts 138, 140 engage the respective first and second threaded fasteners 128, 130 and the yoke portion 114 to provide a means for locking the yoke portion 114 at a plurality of positions.

Figure 5:
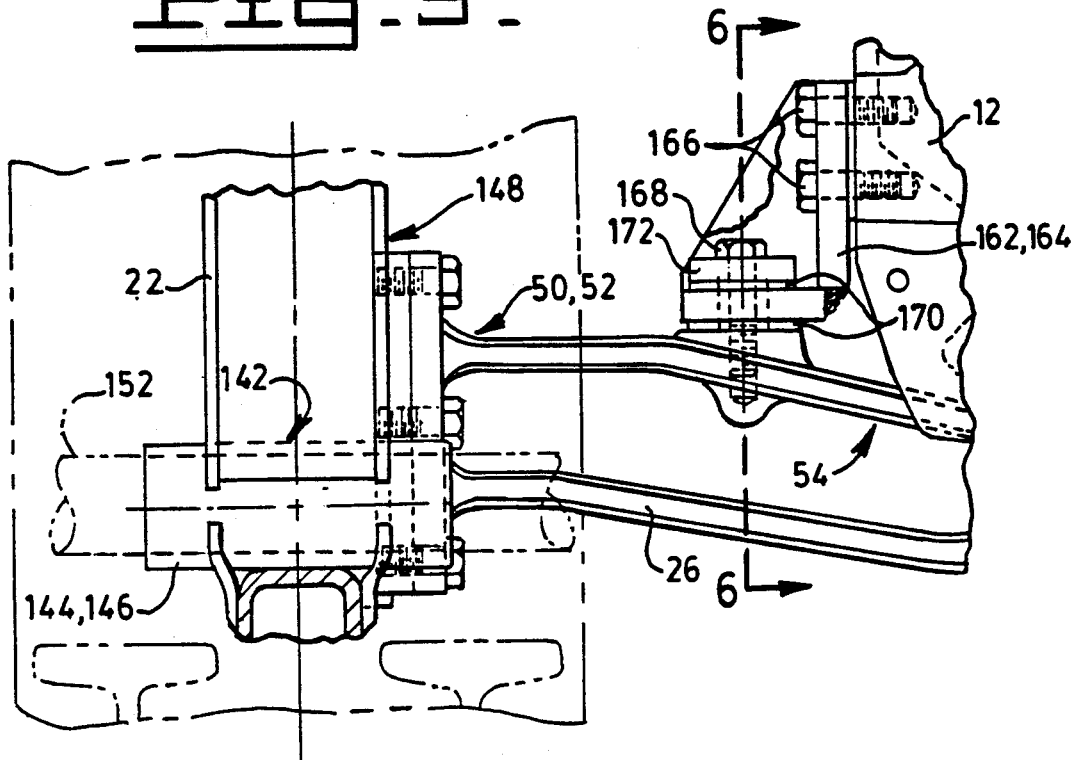
FIG. 5 is a diagrammatic front elevational view, partly in section, of a portion of the support beam, the vehicle frame, and the undercarriage roller frame.
Figure 6:
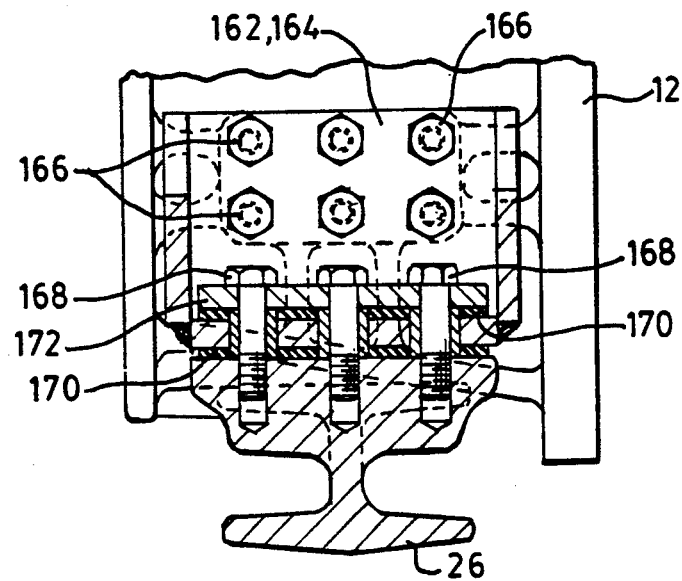
FIG. 6 is a diagrammatic side elevational view, partly in section, taken generally along the lines 6—6 of FIG. 5.
Figure 7:
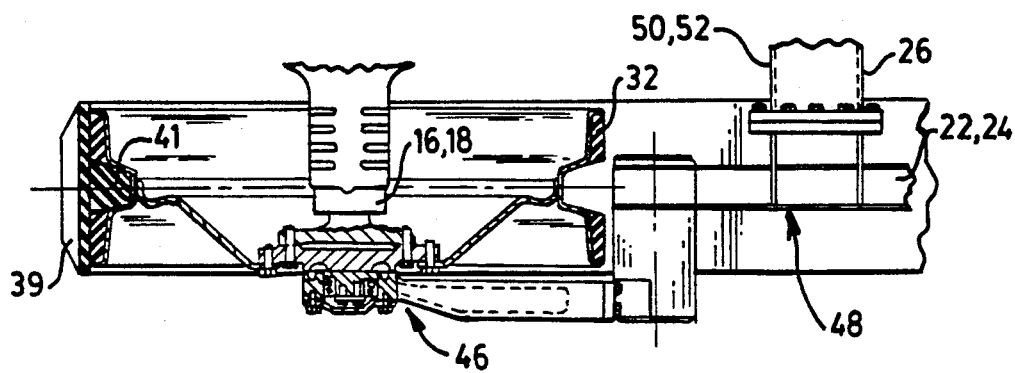
FIG. 7 is a diagrammatic top plan view, partly in section, of a rear drive wheel, a drive axle, a portion of a roller frame assembly, and the connection between the roller frame assembly and the drive axle.
Figure 8:
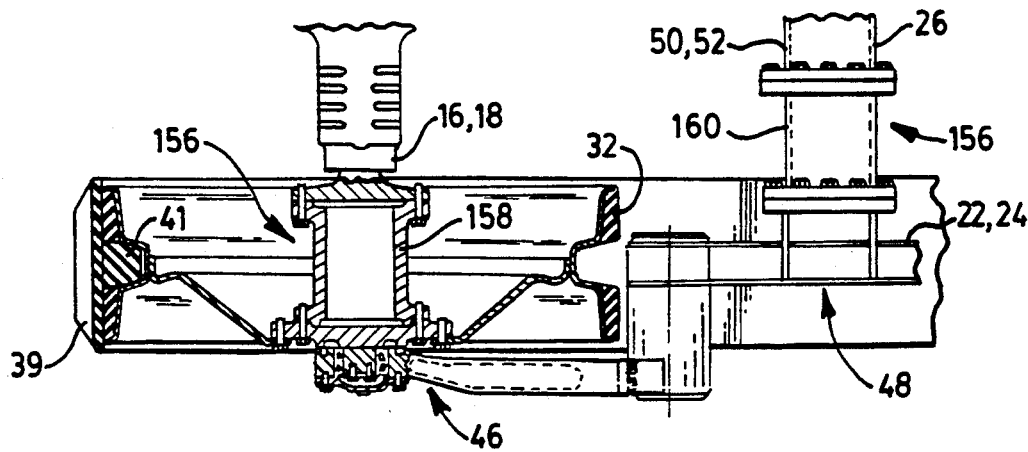
FIG. 8 is a diagrammatic top plan view, partly in section, similar to FIG. 7, with spacers between the drive wheel and the axle and between the roller frame assembly and the support beam.

With particular reference to FIGS. 1 and 5, a means 142 is provided for supporting the first roller frame assemble 22 by the second roller frame assembly 24 when the first roller frame assembly 22 is disconnected from the first drive axle 16 and from the support beam 26. The means 142 includes first and second heavy walled tube sections 144, 146 connected, as by welding, to the first roller frame assembly 22, and third and fourth heavy walled tube sections 148, 150 connected to the second roller frame assembly 24. The supporting means 142 further includes a first bar 152 extending through the first and third tubes 144, 148 and a second bar 154 extending through the second and fourth tubes 146, 150. The same supporting means 142 is used to support the second roller frame assembly 24 by the first roller frame 22 when the second roller frame assembly 24 is disconnected from the second drive axle 18 and from the support beam 26. The first and third tube sections 144, 148 are substantially axially aligned. The first and second bars 152, 154, extend completely across the vehicle 10 and beneath the main frame 12 to engage and extend through the respective tube sections 144, 148 and 146, 150.

With particular reference to FIGS. 5, 6, 7, and 8, a means 156 is provided for positioning each of the roller frame assemblies 22, 24 at a plurality of locations laterally spaced from the main frame 12. The positioning means 156 includes a plurality of first and second spacers 158, 160. The first spacers 158 are adapted to be connected between the second end portions 46 of the roller frame assemblies 22, 24, and the drive axles 16, 18. The second spacers 160 are adapted to be connected between the middle portions 48 of the roller frame assemblies 22, 24 and the first and second ends 50, 52 of the support beam 26. The spacers 158, 160 provide adjustment of the gage setting of the endless track assemblies 36, 38. Although only one set of spacers 158, 160 is illustrated, it is understood that a plurality of different sizes of spacers can be used for varying the gage settings. The supporting means 142 are utilized during the changing of the track gage.

First and second brackets 162, 164 releasably connect the middle portion 54 of the support beam 26 to the main frame 12 of the vehicle 10. The brackets 162, 164 are connected to the main frame 12 by a plurality of first threaded fasteners 166 and to the support beam 26 by a plurality of second threaded fasteners 168. A plurality of resilient spaces 170 are positioned between the support beam and the brackets 162, 164, and between a clamp plate 172 and the brackets 162, 164 and are compressed by the second threaded fasteners 168. This provides a resilient mounting of the support beam 26.

With particular reference to FIGS. 1 and 9, each of the track tensioning mechanisms 40, 42 includes the hydraulic ram assembly 76, an accumulator 174, and a manifold block 176. The hydraulic ram assembly 76 includes a rod 178 and a pressure chamber 180. The accumulator 174 is in direct fluid communication with the pressure chamber 180 through the manifold block 176. The rod 178 includes an eye portion 182 which connects with the first flange portion 62 of the idler assemblies 28, 30. The manifold block 176 includes a fill and shut-off valve assembly 184 and a bleed valve 186. The pressure chamber 180 and accumulator 174 are initially pressurized from a remote hydraulic source, such as the hydraulic implement circuit of the vehicle 10. Once pressurized, the track tensioning mechanisms 40, 42 are substantially self sustaining, since they are void of any hydraulic connections to the vehicle 10. One of more pressure seals 188, which seal on the polished surface of the rod 178, prevent any appreciable fluid leakage from the pressure chamber 180. If the pressure chamber ever needs recharging, the fill and shut-off valve 184 is used. The second end portions 80 of each ram assembly 76 is connected to the roller frame assemblies 22, 24 by mounting pins 192.

Industrial Applicability

With reference to the drawings, the subject invention is particularly useful on agricultural type work vehicles, and more specifically on work vehicles which are supported and propelled by endless elastomeric track belts.
It is advantageous that such vehicles have good traction, low ground pressure, low soil compaction, relatively high ground clearance, and have variable gage capabilities. The variable gage is especially useful for operating the vehicle in agricultural fields having different row crop spacings.

The vehicle 10 is supported and propelled by an undercarriage assembly 20 which includes first and second roller frame assemblies 22, 24, first and second idler assemblies 28, 30, first and second drive wheels 32, 34, and first and second endless track assemblies 36, 38. A self-contained hydraulic belt tensioning mechanism 40, 42 is connected at one end to the roller frame assembly 22, 24 by a pin 192, and is connected at the opposite end to the first self-aligning mechanism 72 by the eye portion 182. The second self-aligning mechanism 90 connects each idler assembly 28, 30 to the roller frame assemblies 22, 24 and provides pivoting of the idler assemblies 28, 30 about the third pin 106 and against the force of the tensioning mechanism 40, 42. The first and second self-aligning mechanism 72, 90 provide for self alignment of the belt 39 on the idler assemblies 28, 30 and prevent extended contact between the guide blocks 41 and the wheels 58, 60.

The gage of the track belts is changed by disconnecting the first end portion 44 and the middle portion 48 of the roller frame assembly 22 from the respective drive axle 16 and the support beam 26. A predetermined spacer 158 and 160 is connected between the drive axle 16 and the roller frame assembly 22 and between the support beam 26 and the roller frame assembly. This procedure is then repeated for the opposite side of the vehicle 10 with the second roller frame assembly 24. While the first roller frame assembly 22 is disconnected from the axle 16 and the support beam 26, it is supported by the supporting means 142 and the second roller frame assembly 24. Likewise, when the second roller frame assembly 24 is disconnected from the axle 16 and the support beam 26, it is supported by the supporting means 142 and the first roller frame assembly 22. During adjustment of the track gage, additional mechanical means are required to move the roller frame assemblies 22, 24 to the proper position along the supporting means 142.

Recoil function is provided by the tensioning mechanisms 40, 42. If debris or foreign material become lodged between the idler wheel assembly 28 and the belt 39, the idler wheel assembly 28 swings rearwardly against the tensioning mechanism 40. The rod 178 moves into the pressure chamber 180 and forces hydraulic fluid into the accumulator 174, which further compresses the gas in the accumulator 174. Once the foreign material exits the area between the idler wheel assembly 28 and the belt 39, the force in the accumulator returns the idler wheel assembly 28 to its original position.

Other aspects, objects and advantages of this invention can be obtained from a study of the drawings, the disclosure, and the appended claims.

I claim:

1. A self-aligning idler wheel assembly for a vehicle having a roller frame and an endless elastomeric belt which encircles the idler wheel assembly and which supports and propels the vehicle, said idler wheel assembly comprising:
    a spindle having first and second spaced apart shaft portions and a middle portion having first and second radially extending flange portions;
    first and second plates rotatably connected to respective first and second shaft portions;
    first and second wheels connected to respective first and second plates; and
    first and second self-aligning mechanisms connected to respective first and second flange portions.

2. An idler wheel assembly, as set forth in claim 1, wherein said first self-aligning mechanism includes a spherical bearing assembly.

3. An idler wheel assembly, as set forth in claim 1, wherein said second self-aligning mechanism includes a universal type apparatus having a block portion having first, second, and third connecting pins, said third pin positioned at an angle which is substantially normal to said first and second pins, said second flange portion being adapted to be pivotally connected to said third connecting pin.

4. An idler wheel assembly, as set forth in claim 1, wherein said vehicle includes an hydraulic belt tensioning mechanism, said first self-aligning mechanism being connected to said belt tensioning mechanism, and said second self-aligning mechanism being connected to said roller frame.

5. An idler wheel assembly, as set forth in claim 4, including a retaining pin adapted to connect said first self-aligning mechanism to said belt tensioning mechanism, said retaining pin having a radially extending connecting portion which is connected to a said first flange portion.

6. An idler wheel assembly, as set forth in claim 1, wherein said first flange portions includes fist and second spaced flanges and said first self-aligning mechanism is positioned between said first and second flanges.

7. An idler wheel assembly, as set forth in claim 2, wherein each of said flange portions includes first and second flanges defining a space therebetween and said spherical bearing assembly is positioned within one of said spaces.

8. An idler wheel assembly, as set forth in claim 1, wherein said second flange portions include third and fourth spaced flanges and said second self-aligning mechanism is positioned between and connected to said third and fourth flanges.

9. An idler wheel assembly, as set forth in claim 3, wherein said universal type apparatus includes a lever member having a yoke portion and said block portion, said block portion having a bore extending therethrough at an angle substantially normal to said first and second connecting pins, said third connecting pin being positioned within said bore, and means for securing said third connecting pin within said bore.

10. An idler wheel assembly, as set forth in claim 9, wherein said universal type apparatus includes a cap member having a mounting portion and a pin receiving portion, said mounting portion being adapted to be connected to said roller frame and said pin receiving portion being adapted to receive said second connecting pin, said yoke portion of said lever member being adapted to surround said mounting portion.

11. An idler wheel assembly, as set forth in claim 10, wherein said roller frame includes a forwardly extending nose portion which is adapted to receive said first connecting pin, and means for connecting said extending nose portion to said pin receiving portion of said cap member.

12. An idler wheel assembly, as set forth in claim 9, wherein said means for securing said third connecting pin within said bore includes a circumferential groove in said third pin and a threaded fastener extending through said block portion and engaging said groove.

13. An idler wheel assembly, as set forth in claim 3, wherein said universal type apparatus includes a cap member and a lever member, said cap member having a mounting portion connected to said roller frame and a pin receiving portion adapted to receive said second connecting pin, said lever member having a yoke portion being adapted to surround said mounting portion, and means for moving said yoke portion laterally relative to said cap member and means for locking said yoke portion at a plurality of positions.

14. An idler wheel assembly, as set forth in claim 13, wherein said moving and locking means includes first and second threaded fasteners and first and second lock nuts associated with respective first and second threaded fasteners.

15. A self-aligning idler wheel assembly for a vehicle having a roller frame, said idler wheel assembly comprising:

a spindle having first and second spaced apart shaft portions and a middle portion having first and second flange portions;

first and second spaced apart wheels rotatably connected to respective first and second shaft portions;

a first self-aligning mechanism, including a spherical bearing assembly, connected to said first flange portion;

a second self-aligning mechanism, including a universal type apparatus, connected to said second flange portion; and means for pivotally connecting said second self-aligning mechanism to said roller frame.

16. An idler wheel assembly as set forth in claim 15, wherein said vehicle includes an hydraulic tensioning mechanism and said first self-aligning mechanism is connected to said hydraulic tensioning mechanism.

17. An idler wheel assembly, as set forth in claim 15, wherein said connecting means includes a lever member having first, second, and third connecting pins, said second flange portion being pivotally connected to said third connecting pin, and said roller frame being pivotally connected to said first and second connecting pins.

18. An idler wheel assembly, as set forth in claim 17, wherein said connecting means further includes a cap member having a mounting portion and a pin receiving portion, said mounting portion adapted to be connected to said roller frame and said pin receiving portion adapted to receive said second connecting pin.

19. An idler wheel assembly, as set forth in claim 18, wherein said roller frame includes a forwardly extending nose portion which is adapted to receive said first connecting pin, and means for releasably connecting said extending portion to said pin receiving portion of said cap member.

20. An idler wheel assembly, as set forth in claim 18, wherein said lever member has a yoke portion which is adapted to surround said cap member mounting portion, and means for moving said yoke portion relative to said cap member and means for locking said yoke portion at a plurality of positions.

* * * * *